United States Patent

[11] 3,550,621

| [72] | Inventors | Zdenek J. Lansky<br>Winnetka;<br>Kurt W. Leibfritz, Norridge; Lester W.<br>Malinowski, Mount Prospect, Ill. |
|---|---|---|
| [21] | Appl. No. | 753,925 |
| [22] | Filed | Aug. 20, 1968 |
| [45] | Patented | Dec. 29, 1970 |
| [73] | Assignee | Parker-Hannifin Corporation<br>Cleveland, Ohio<br>a corporation of Ohio |

[54] FLUID DISTRIBUTING MANIFOLD FOR DIRECTIONAL CONTROL VALVE
20 Claims, 6 Drawing Figs.

[52] U.S. Cl. .................................................. 137/608
[51] Int. Cl. .................................................. F16d 1/00
[50] Field of Search .......................................... 137/608, 596, 625.24, 270, 271

[56] References Cited
UNITED STATES PATENTS

| 3,025,878 | 3/1962 | Hupp .......................... | 137/608X |
| 3,053,279 | 9/1962 | Likely et al. ................. | 137/596 |
| 3,072,148 | 1/1963 | Carls .......................... | 137/596 |
| 3,195,572 | 7/1965 | Carls .......................... | 137/608 |
| 3,199,539 | 8/1965 | Leathem ...................... | 137/625.24 |
| 3,270,776 | 9/1966 | Carls .......................... | 137/270X |
| 3,298,460 | 1/1967 | Porter et al. ................. | 137/271X |
| 3,384,114 | 5/1968 | Hathaway et al. ............ | 137/608 |
| 3,386,463 | 6/1968 | Flick et al. ................... | 137/270 |

*Primary Examiner*—Samuel Scott
*Attorney*—John N. Wolfram

ABSTRACT: A distributing manifold arrangement for a directional valve that controls the supply and exhaust of fluid to a fluid operated motor, the manifold having a main block attached to the valve and having side plates and an end plate attached thereto and there being means for directing fluid flow in various manners through the block and plates.

INVENTOR.
ZDENEK J. LANSKY
KURT W. LEIBFRITZ
LESTER W. MALINOWSKI

BY John N. Wolfram
ATTORNEY

3,550,621

FLUID DISTRIBUTING MANIFOLD FOR DIRECTIONAL CONTROL VALVE

BACKGROUND OF THE INVENTION

Directional valves for controlling flow of fluid to and from fluid operated motors must accommodate a variety of installation requirements. For example, some installations may require speed control valves mounted near the directional valve rather than at the motor, others require motor ports at the end of the manifold block upon which the valve is mounted instead of at the side, some require dual exhaust ports while others require only a single exhaust port, some require two electrical outlets while others require only one, etc. To provide either a special valve body or a special manifold block for each particular installation would require a large assortment of valve bodies and manifold blocks to be manufactured and stocked and would reduce flexibility in making installations in the field.

BRIEF DESCRIPTION OF THE INVENTION

This invention provides a manifold block for a direction control valve along with a set of side plates and an end plate, all being ported and arranged to permit use in a variety of installations by simply plugging unneeded external ports and by selectively utilizing tubular internal adapters between the manifold block and end plate. The manifold block has on its upper face pressure, motor and exhaust ports registerable with corresponding ports in the directional control valve body to which the manifold block is attached. The manifold block has internal passages connecting the pressure and exhaust ports on the upper face with similar ports on each side face and it has other passages connecting the pressure, exhaust and motor ports on its upper face with ports on the end face of the manifold block.

The exhaust ports at the end face and the exhaust ports on the side faces of the manifold communicate with a recess in the end face that registers with a pair of exhaust ports in the end plate. Tubular adapters are insertable between the end plate and manifold block to permit selective connection of the exhaust passages with each other and/or with the exhaust ports in the end and side plates.

Moreover, two or more manifold blocks may each have a side plate omitted from one side face and the manifold blocks sealingly attached to each other for respectively connecting the exhaust and pressure passages of one manifold block with those of the other whereby both manifold blocks will receive pressure fluid from a common source and deliver exhaust fluid to common outlet ports.

Also, the side plates are formed with straight internal pipe threads so that identical side plates may be mounted on either side of the manifold block and connect to taper pipe threaded conduits despite the fact that the bolt holes for attaching the side plates to the manifold block are asymmetrical and therefore the side plates are not capable of having the same face against the manifold block regardless of which side of the block it is mounted upon.

DESCRIPTION

Figure 1:
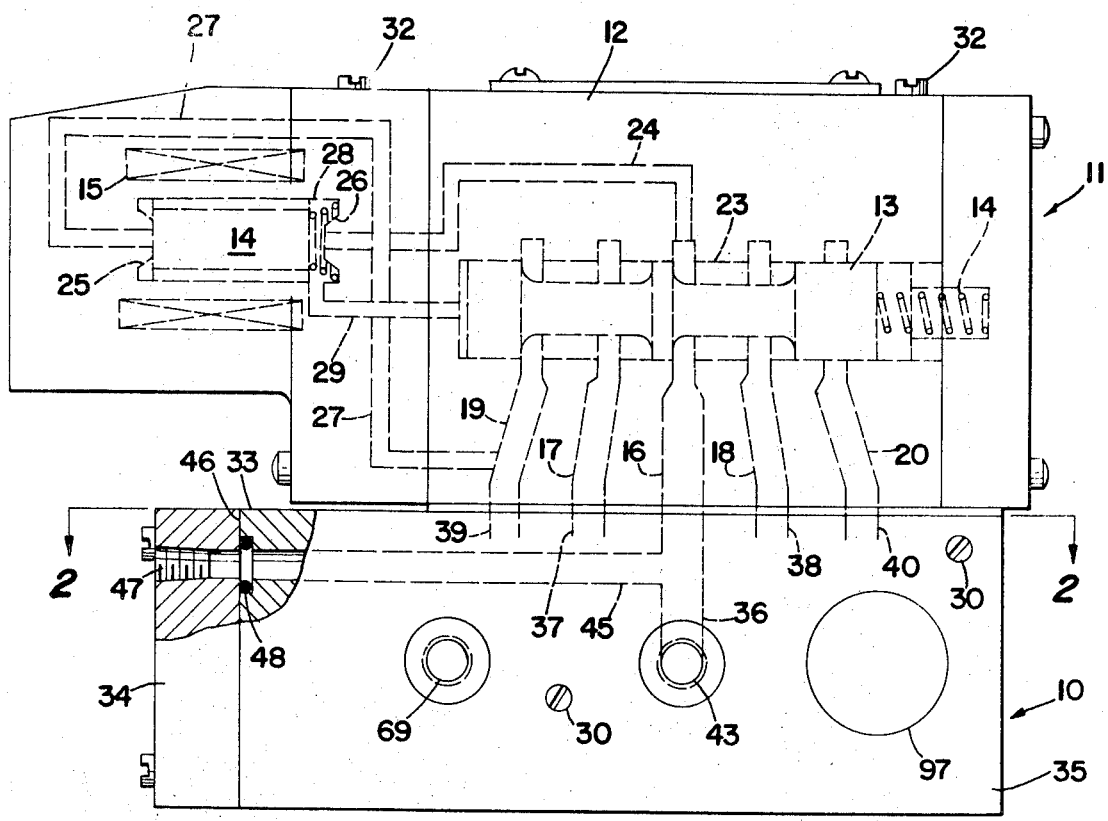
FIG. 1 is a side view of a directional control valve with a distributing manifold attached thereto, in enlarged scale.

As shown in FIG. 1, manifold assembly 10 is used in conjunction with a conventional directional control valve 11 that comprises a main valve body 12 having a main spool valve 13 therein that is controlled by a pilot valve 14 operated by a solenoid 15.

Although the main valve 11 may vary as to form, the conventional arrangement shown utilizes an inlet passage 16, a pair of motor passages 17, 18 and a pair of exhaust passages 19, 20. These passages intersect a valve bore 23 in which valve spool 13 is slidably mounted. A spring 14 normally holds the valve spool in a leftward position in which inlet passage 16 is open to motor passage 18 and motor passage 17 is open to exhaust passage 19.

A pilot pressure line 24 connects inlet passage 16 with a pilot valve seat 26 and a second pilot valve seat 25 is connected to exhaust passage 19 by exhaust pilot line 27. Between seats 25, 26 is an armature chamber 28 in which pilot valve element 14 is slidably mounted. A pilot feed passage 29 connects valve chamber 28 with the left end of spool 13.

When only one directional control valve 11 is to be used in the installation, a single manifold assembly 10 is attached thereto by means of bolts 32 and comprises a manifold block 33, a pair of identical side plates 35 bolted to the side faces of block 33 by asymmetrically located bolts 30 and an end plate 34 bolted on one end of block 33.

Figure 2:
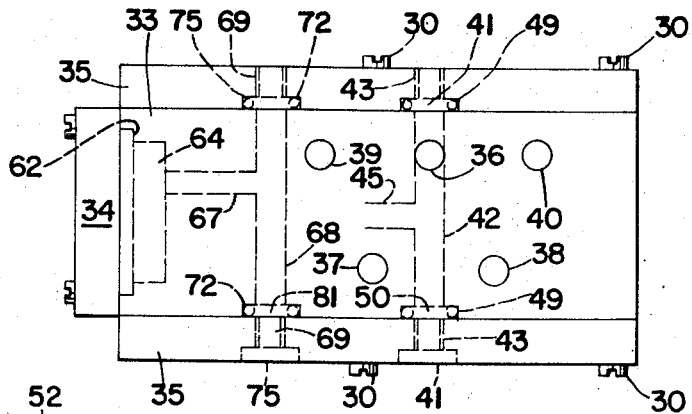
FIG. 2 is a top view of one of the manifolds along the lines 2–2 of FIG. 1.

Manifold block 33 has a pressure passage 36, a pair of motor passages 37, 38 and a pair of exhaust passages 39, 40 that intersect the top face of block 33 and register respectively with passages 16, 17, 18, 19 and 20 of valve body 12. A branch 42 (see FIG. 2) of passage 36 passes laterally through the block 33 to register with pressure ports 43 in plates 35 and there is another branch 45 that extends longitudinally to intersect end face 46 of the block and register with a pressure inlet port 47 in end plate 34. Passage 45 is sealed with respect to end plate 34 by an O-ring 48 in a recess surrounding passage 45. Likewise, passage 42 is sealed by O-rings 49 at its junctures with end plates 35.

Figure 5:
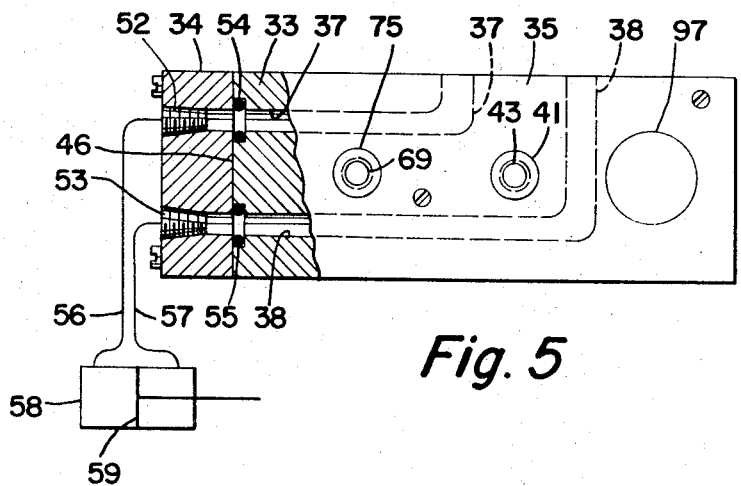
FIG. 5 is a side view of the manifold with a partial section along the lines 5–5 of FIG. 3.

As shown in FIG. 5, motor passages 37, 38 in block 33 extend vertically and then horizontally to block end face 46 where they register respectively with motor ports 52, 53 formed in end plate 34 and are sealed relative to the latter by O-rings 54, 55. Motor ports 52, 53 may be connected by tubing lines 56, 57 to opposite ends of a fluid motor 58 having a movable piston 59 therein.

Figure 4:
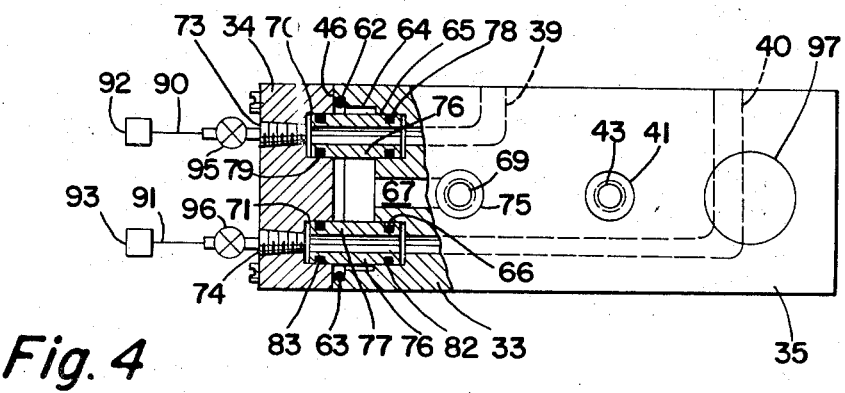
FIG. 4 is a side view of the manifold with a partial section on lines 4–4 of FIG. 3.

As shown in FIG. 4, manifold block end face 46 has formed therein a first recess 62 having an O-ring 63 therein that seals against end plate 34. A second recess 64 communicates with recess 62. A first cylindrical counterbore 65 connects exhaust passage 39 with recess 64 and a second cylindrical counterbore 66 connects exhaust passage 40 with recess 64. Another exhaust passage 67 connects recess 64 with a transverse passage 68 (see FIG. 2) that intersects the side faces of block 33 and registers with exhaust ports 69 formed in side plates 35. Passage 68 is sealed relative to side plates 35 by O-rings 72.

End plate 34 has a pair of exhaust ports 73, 74 therein, each communicating at its inner end respectively with counterbores 70, 71. Removably mounted between the manifold block and end plate 34 are a pair of tubular adapters 76, 77. Adapter 76 has one end extending into counterbore 65 and its other end into counterbore 70 and there are O-rings 78, 79 that seal the adapter in the respective counterbores. Adapter 77 likewise extends into counterbores 66 and 71 and is sealed relative thereto by O-rings 82, 83.

Because the holes in side plates 35 through which bolts 30 pass are asymmetrically located it is not possible to place one side plate 35 against one side of the block and to place another identical side plate 35 on the other side of the block after rotating the latter side plate so that the same relative face of each side plate is against the manifold block as the bolt holes would then not line up. To permit the use of identical side plates requires that one face of one side plate be against one side of the block and that the relatively opposite face of the other side plate be against the other side face of the block. One method of providing for this is to tap tapered threads in ports 43 and 69 from each side face of side plate 35. Another method, as illustrated in the drawings, is to provide ports 43 and 69 in side plate 35 in the form of straight internal pipe threads. One end of the threaded ports 43, 69 intersect a face of the plate and the other end intersects a respective counterbore 41, 75. Each manifold block 33 has at one face counterbores 50, 81 respectively surrounding passages 42, 68.

Figure 3:
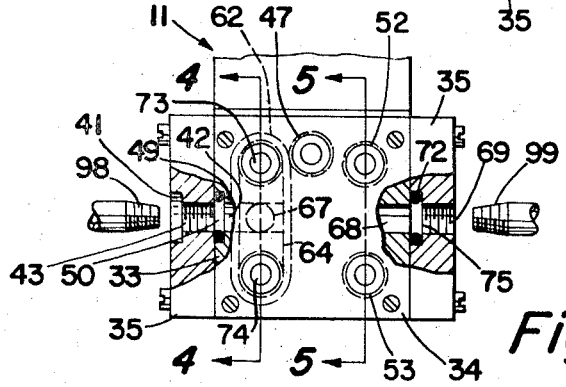
FIG. 3 is an end view of the manifold but partly in section.

Thus, as shown in FIG. 3, the side plate 35 appearing at the left has its face in which counterbores 41 and 75 are formed located away from block 33 while side plate 35 appearing at the right side has its corresponding face against block 33, in which case the asymmetrically located holes for bolts 30 are in alignment. A pipe with a tapered pipe thread 98 is insertable through counterbore 41 of the left hand plate 35 and engageable with straight pipe thread 43 and another pipe with a tapered pipe thread 99 is directly engageable with straight pipe thread 69.

Figure 6:
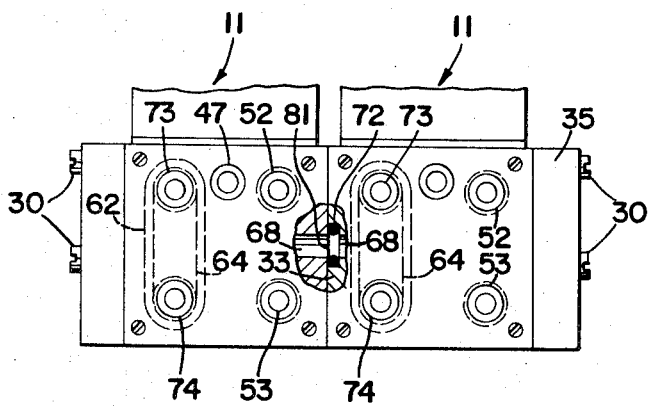
FIG. 6 is a fragmentary end view, partly in section, showing two valves and two manifolds attached to each other.

When two manifold blocks 33 are joined, as shown in FIG. 6, the O-ring 72 in block counterbore 81 of the right hand block 33 seals against the face surface of the left hand block that surrounds passage 68 in the latter. Passages 42 in the pair of blocks 33 of FIG. 6 are similarly in register and sealed by an O-ring 49 in the counterbore 50 shown in FIG. 2.

The valve and manifold assembly as shown in FIGS. 1 through 5 may be utilized in various manners as follows.

Cylinder ports 52, 53 may be connected to a double acting motor, as shown in FIG. 5. A fluid pressure line may be attached to the inlet port 43 in either or both of the side plates 35 and/or port 47 in end plate 34. Any of these ports not used for connection to the pressure line are to be plugged from the exterior.

With tubular adapters 76, 77 in plate as shown in FIG. 4, exhaust lines 90, 91 may be connected respectively to ports 73, 74 and have at their ends mufflers 92, 93 for discharging exhaust fluid (which may be air or the like) to atmosphere. Mounted either in lines 90, 91 or directly in ports 73, 74 are speed control valves 95, 96. These may be conventional needle valves adjustable to any desired setting for restricting flow of exhaust fluid from the opposite ends of cylinder 58 to thus set up back pressures for controlling the speed at which piston 59 moves in each direction.

Alternatively, either or both of the speed control valves 95, 96 and the corresponding muffler 92, 93 can be replaced by a nozzle (not shown) for doing work with the exhaust air, such as flowing away metal chips on a machine tool upon which cylinder 58 is installed.

Also, either or both of the adapters 76, 77 may be removed and the corresponding port 73, 74 plugged. In such cases the exhaust air from either or both passages 39, 40, as the case may be, will discharge into recess 64 and pass therefrom into passage 67 and then to passage 68 for exhausting through either or both ports 69 in side plates 35, depending upon whether either or both of the ports 69 are unplugged.

Side plates 35 each also has an opening 97 through which electric leads may be brought for connection to solenoid 15. Such leads may be brought through either or both of the side plates 35 shown in FIG. 2. If one of the openings 97 is not used for this purpose it may be plugged.

I FIG. 6 shows how two of the valve and manifold assemblies may be joined together for using common pressure and/or exhaust ports. Thus, the side plates 35 between the two manifold blocks 33 are removed and the manifold blocks 33 butted against each other whereby the left hand block 33 contacts O-ring 72 to sealingly join passages 68 in the two blocks. Likewise, the left hand block 33 contacts an O-ring 49 in the right hand block to sealingly join the passages 42 therein. Obviously three or more valve and manifold assemblies may be joined in a similar manner.

We claim:

1. A manifold assembly for attachment to a valve block comprising a manifold block having a first face and having pressure, motor, and at least two exhaust passages in said block each opening through said first face for registering with corresponding passages in the valve block, the pressure and motor passages also opening to the exterior of the manifold block at other locations, a shallow recess in a second face of the manifold block, said exhaust passages connecting to said recess with said exhaust passages facing generally outwardly of said manifold block through said recess and said second face, and an end plate attached to the manifold block and covering said recess.

2. The manifold of claim 1 in which there is another exhaust passage in said block having one end communicating with said recess and another end with the exterior of the block.

3. The manifold of claim 1 in which said motor passages open into said second face at spaced locations and said end plate has first and second motor ports therethrough respectively connected with said first and second motor passages.

4. The manifold of claim 1 in which said other location for the pressure passage opening is on another face of the block and there is a side plate attached to said other face, and the side plate has a part therethrough registering with said pressure passage opening.

5. The manifold of claim 1 in which said other location for the motor passage openings is on said second face and the end plate has motor ports therethrough registering with said motor passage openings.

6. The manifold of claim 1 in which the end plate has first and second exhaust ports communicating with said recess.

7. The manifold of claim 6 in which a first tubular adapter traverses the recess and sealing connects the first exhaust passage to said first exhaust port.

8. The manifold of claim 7 in which the tubular member has a slip fit in said first exhaust passage and said first exhaust port so as to be readily insertable and removable therefrom.

9. The manifold of claim 7 in which another tubular adapter traverses the recess and sealingly connects the second exhaust passage directly to the second exhaust port.

10. The manifold of claim 7 in which the first exhaust passage and the first exhaust port have aligned smooth cylindrical portions of enlarged diameter that receive opposite ends of the tubular adapter, and there is a packing at each of the adapter that seals the same relative to the respective cylindrical portion.

11. The manifold of claim 7 in which there is another recess outwardly of the first mentioned recess and there is a sealing ring in said another recess that sealingly engages the manifold block and the end plate.

12. The manifold of claim 1 in which said pressure and motor passage openings are on said second face and the end plate has ports therethrough registering with said pressure and motor passage openings.

13. The manifold of claim 12 in which the block has a branch exhaust passage connected to the recess and open to a side face of the block, and said pressure passage openings being in said side face, and there is a side plate attached to said side face and having exhaust and pressure ports registering with said exhaust and pressure openings in the side face.

14. The manifold of claim 13 in which there are exhaust and pressure openings in another side face of the block that are connected with said exhaust and pressure passages, and there is another side plate attached to said another side face and having ports therethrough registering with the exhaust and pressure openings in said another side face.

15. A manifold assembly comprising a manifold block having a through passage extending from a first side face on the block to a second side face thereon, a pair of identical side plate each having first and second surfaces, asymmetrically located bolt holes through the side plates, bolts in said holes attaching the side plates to the block with one side plate having its first surface against said first face and its second surface exposed and with the other side plate having its second surface against said second face and its first surface exposed, each of said side plates having a port therethrough intersecting the respective first and second surfaces and in register with said through passage, and a thread in each port accessible through the respective exposed surface for connection to a threaded member.

16. The manifold assembly in of claim 15 in which the second surface of each side plate has a counterbore surrounding the port therein and in which a packing ring may be received and in which the first surface of each side plate has a sealing surface portion surrounding the port therein.

17. The manifold assembly of claim 16 in which the thread is straight and in which the first face of the block has a counterbore therein surrounding the through passage and the second face of the block has a sealing portion surrounding the through passage, a packing ring in the counterbore in the block and contacting the sealing portion of said one side plate and a packing ring in the counterbore of said other side plate and contacting said sealing portion of said block.

18. A manifold assembly comprising a first manifold block having a through passage extending from a first side face on the block to a second side face thereon, a first side plate having first and second surfaces, asymmetrically located bolt holes in the side plate, corresponding bolt receiving holes in said first side face, bolts received in said holes attaching the side plate to the block with its first surface against said first face and its second surface exposed, the side plate having a port therethrough intersecting the first and second surfaces and in register with the through passage, said exposed surface having a counterbore surrounding the port and said first surface having a sealing portion surrounding the port, said first side face having a counterbore surrounding the through passage and having a packing therein contacting the sealing portion of said side plate and said second side face having a sealing portion surrounding the through passage, said second side face having bolt receiving openings that have the same locations relative to the through passage as the bolt holes in the side plate have with respect to the port in the side plate whereby either a second side plate identical to the first side plate and having a packing in its counterbore may be bolted to the first block with its second surface against the second side face and the packing therein against the sealing portion of the second side face or a second block identical to the first block and having a packing in its counterbore may be bolted to the first block with its first side face against the second side face of the first block and the packing therein against the sealing portion of the first block.

19. The assembly of claim 18 in which the ports in the side plates have threads therein that are accessible for attachment of a threaded conduit thereto regardless of whichever of the first and second surfaces thereon are exposed when the side plates are attached to said first block.

20. The assembly of claim 19 in which the threads in said ports are straight.